US012724795B1

(12) United States Patent
Kumar et al.

(10) Patent No.: US 12,724,795 B1
(45) Date of Patent: Sep. 1, 2026

(54) AUTOMATIC CONFIGURATION OF PARAMETERS ACROSS MULTIPLE COMPUTE ENGINES IN DATA LAKEHOUSE ENVIRONMENTS

(71) Applicant: International Business Machines Corporation, Armonk, NY (US)

(72) Inventors: Kapish Kumar, Bangalore (IN); Nishant Sinha, Pune (IN); Juilee A. Joshi, Pune (IN); Nitin Gupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/096,869

(22) Filed: Apr. 1, 2025

(51) Int. Cl.
*G06F 16/28* (2019.01)

(52) U.S. Cl.
CPC .................................. *G06F 16/283* (2019.01)

(58) Field of Classification Search
CPC ..................................................... G06F 16/283
See application file for complete search history.

(56) References Cited

U.S. PATENT DOCUMENTS 12,117,980 B1 10/2024 Chacko et al.
2025/0363263 A1* 11/2025 Green .................... G06F 40/20

FOREIGN PATENT DOCUMENTS

CN 119580978 A * 3/2025 ........... G06F 3/0481
KR 10-2569185 B1 8/2023

OTHER PUBLICATIONS

Mazumdar, What is a data lakehouse and how does it work? pp. 1-17, Jul. 11, 2024.*
Almeida et al., "Automatic Library Migration Using Large Language Models: First Results", arXiv:2408.16151 [cs.SE], Aug. 28, 2024, 7 pages.
Huang et al., "LLMTune: Accelerate Database Knob Tuning with Large Language Models", arXiv:2404.11581v1 [cs.AI], Apr. 17, 2024, 14 pages.
No Author, "Enabling self-tuning memory", https://www.ibm.com/docs/en/db2/11.5.x?topic=overview-enabling-self-tuning-memory, Jan. 17, 2025, 3 pages.

* cited by examiner

*Primary Examiner* — Albert M Phillips, III
(74) *Attorney, Agent, or Firm* — Cantor Colburn LLP; Stephen Yoder

(57) ABSTRACT

The disclosed methods provide automatic configuration of system parameters across multiple compute engines within a data lakehouse environment. The process begins by obtaining configuration parameters from both a first and second compute engine. Utilizing a pre-trained large language model (LLM), the method analyzes the first set of parameters to establish contextual definitions, which are compiled into a configuration definition file. Similarly, the second set of parameters is analyzed and documented in another configuration definition file. The method then determines correspondences between parameters from the two sets by comparing their respective definition files. Based on these correspondences, the second compute engine automatically applies parameter values from the first set to the second set. This approach streamlines the transition between compute engines, ensuring efficient parameter mapping and application, thereby optimizing performance and reducing manual configuration efforts.

18 Claims, 3 Drawing Sheets

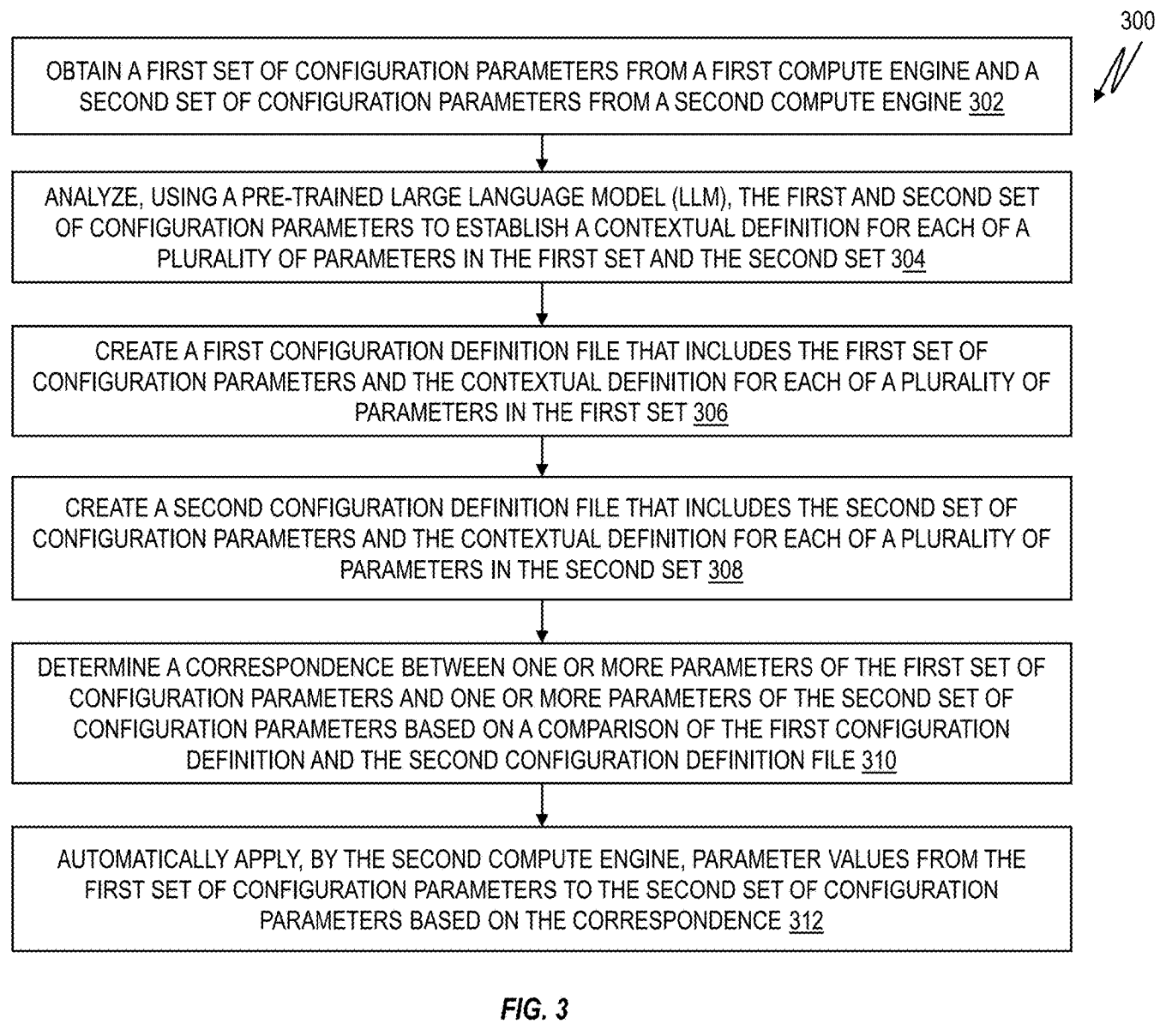

300

OBTAIN A FIRST SET OF CONFIGURATION PARAMETERS FROM A FIRST COMPUTE ENGINE AND A SECOND SET OF CONFIGURATION PARAMETERS FROM A SECOND COMPUTE ENGINE 302

ANALYZE, USING A PRE-TRAINED LARGE LANGUAGE MODEL (LLM), THE FIRST AND SECOND SET OF CONFIGURATION PARAMETERS TO ESTABLISH A CONTEXTUAL DEFINITION FOR EACH OF A PLURALITY OF PARAMETERS IN THE FIRST SET AND THE SECOND SET 304

CREATE A FIRST CONFIGURATION DEFINITION FILE THAT INCLUDES THE FIRST SET OF CONFIGURATION PARAMETERS AND THE CONTEXTUAL DEFINITION FOR EACH OF A PLURALITY OF PARAMETERS IN THE FIRST SET 306

CREATE A SECOND CONFIGURATION DEFINITION FILE THAT INCLUDES THE SECOND SET OF CONFIGURATION PARAMETERS AND THE CONTEXTUAL DEFINITION FOR EACH OF A PLURALITY OF PARAMETERS IN THE SECOND SET 308

DETERMINE A CORRESPONDENCE BETWEEN ONE OR MORE PARAMETERS OF THE FIRST SET OF CONFIGURATION PARAMETERS AND ONE OR MORE PARAMETERS OF THE SECOND SET OF CONFIGURATION PARAMETERS BASED ON A COMPARISON OF THE FIRST CONFIGURATION DEFINITION AND THE SECOND CONFIGURATION DEFINITION FILE 310

AUTOMATICALLY APPLY, BY THE SECOND COMPUTE ENGINE, PARAMETER VALUES FROM THE FIRST SET OF CONFIGURATION PARAMETERS TO THE SECOND SET OF CONFIGURATION PARAMETERS BASED ON THE CORRESPONDENCE 312

*FIG. 3*

AUTOMATIC CONFIGURATION OF PARAMETERS ACROSS MULTIPLE COMPUTE ENGINES IN DATA LAKEHOUSE ENVIRONMENTS

BACKGROUND

The present disclosure generally relates to computer systems and software, specifically to methods and systems for the automatic configuration of system parameters across multiple compute engines in data lakehouse environments.

In modern data lakehouse environments, users can select among various compute engines to enhance performance for specific workloads. These engines leverage shared metadata to gather information from multiple data sources, enabling smooth data integration. Nonetheless, each query engine comes with predefined configuration parameters that users often modify over time to meet performance goals. This task becomes complex when operational or organizational changes necessitate transitioning to a different compute engine, requiring the adjustment of system parameters to ensure optimal query execution.

Traditional approaches typically involve manual reconfiguration, which is time-consuming and requires a comprehensive understanding of both the current and new engine's parameters. This manual method can lead to delays, inefficient use of resources, and potential business impacts due to the learning curve involved in understanding and mapping configuration parameters across different engines. As workloads change, the demand for an efficient method to manage and transition configuration parameters across various compute engines becomes increasingly important.

SUMMARY

Embodiments of the present disclosure are directed to computer-implemented methods for automatic configuration of system parameters across multiple compute engines in data lakehouse environments. According to an aspect, a computer-implemented method includes obtaining a first set of configuration parameters from a first compute engine, obtaining a second set of configuration parameters from a second compute engine, and analyzing, using a pre-trained large language model (LLM), the first set of configuration parameters to establish a contextual definition for each of a plurality of parameters in the first set. The method also includes creating a first configuration definition file that includes the first set of configuration parameters and the contextual definition for each of a plurality of parameters in the first set, analyzing, using the pre-trained LLM, the first set of configuration parameters to establish a contextual definition for each of a plurality of parameters in the second set, and creating a second configuration definition file that includes the second set of configuration parameters and the contextual definition for each of a plurality of parameters in the second set. The method further includes determining a correspondence between one or more parameters of the first set of configuration parameters and one or more parameters of the second set of configuration parameters based on a comparison of the first configuration definition and the second configuration definition file and automatically applying, by the second compute engine, parameter values from the first set of configuration parameters to the second set of configuration parameters based on the correspondence.

Embodiments also include computer systems and computer program products for automatic configuration of system parameters across multiple compute engines in data lakehouse environments.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 3 depicts a flowchart of a method for automatic configuration of system parameters across multiple compute engines in data lakehouse environments in accordance with one or more embodiments of the present disclosure.

DETAILED DESCRIPTION

Figure 1:
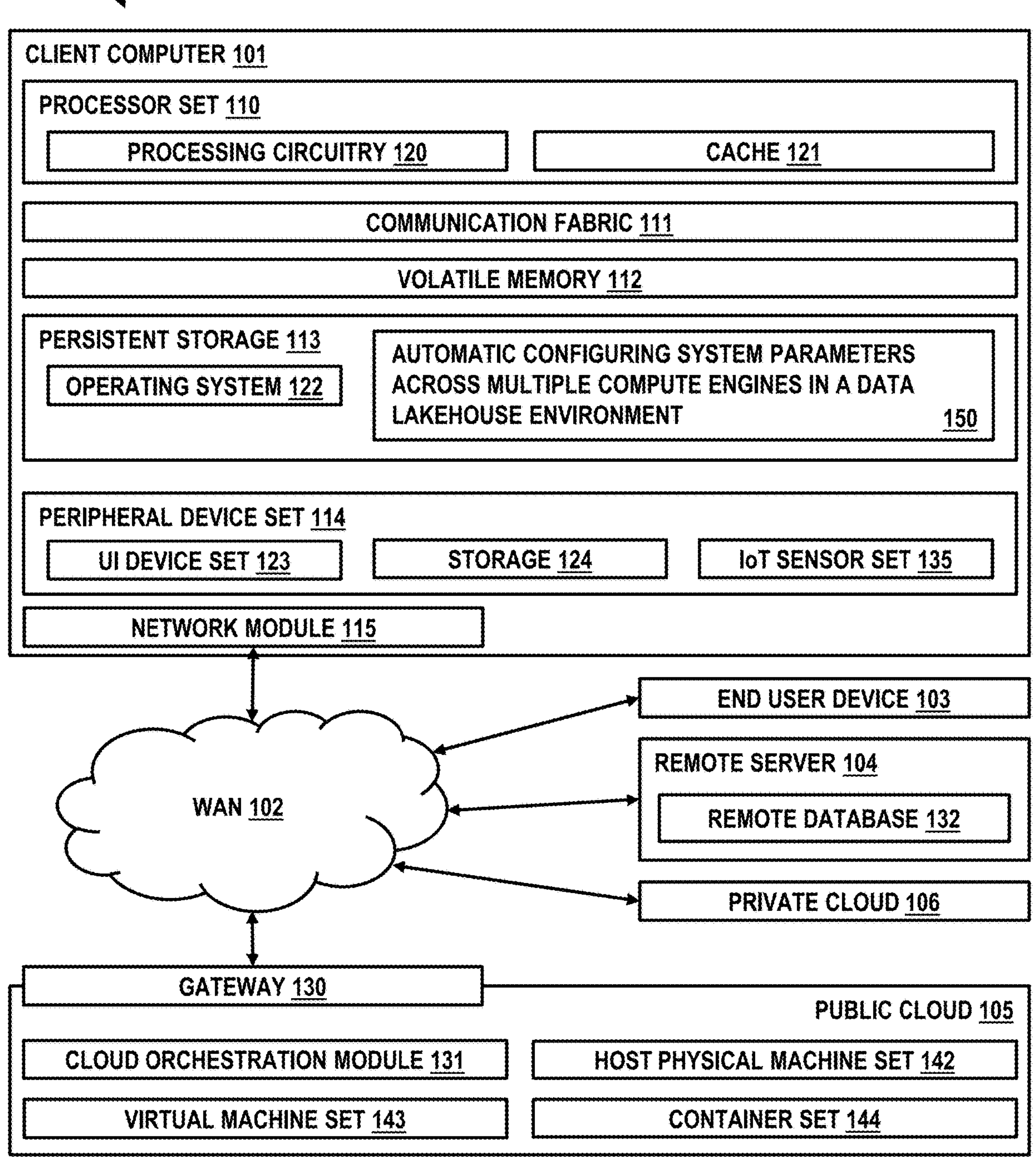
FIG. 1 depicts a block diagram of an example computer system for use in conjunction with one or more embodiments of the present disclosure.

In contemporary data lakehouse settings, users have the advantage of choosing among various compute engines to enhance workload performance. These engines rely on shared metadata to seamlessly integrate data from diverse sources. However, each engine comes with default configuration parameters that users frequently modify to achieve desired performance levels. The challenge intensifies when there is a need to switch to a different compute engine due to operational or organizational shifts, necessitating the reconfiguration of system parameters for optimal query execution. Traditionally, this involves a manual reconfiguration process, which is not only time-consuming but also demands a thorough understanding of the parameters of both the existing and new engines. This manual approach can result in delays, inefficient use of resources, and potential business impacts due to the steep learning curve involved in mapping configuration parameters across different engines. As workloads continue to evolve, there is an increasing demand for a more efficient method to manage and transition configuration parameters across various compute engines.

The present system and method address these challenges by introducing a mechanism for automatically configuring system parameters across multiple compute engines in a data lakehouse environment. The approach leverages a pre-trained large language model (LLM) to analyze and establish contextual definitions for configuration parameters from different compute engines. By creating configuration definition files that include these parameters and their contextual meanings, the system can determine correspondences between the parameters of different engines. This enables the automatic application of parameter values from one engine to another, significantly reducing the time and effort required for reconfiguration and allowing users to transition between engines with minimal disruption.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as automatic configuration of system parameters across multiple compute engines in data lakehouse environments (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments.

Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
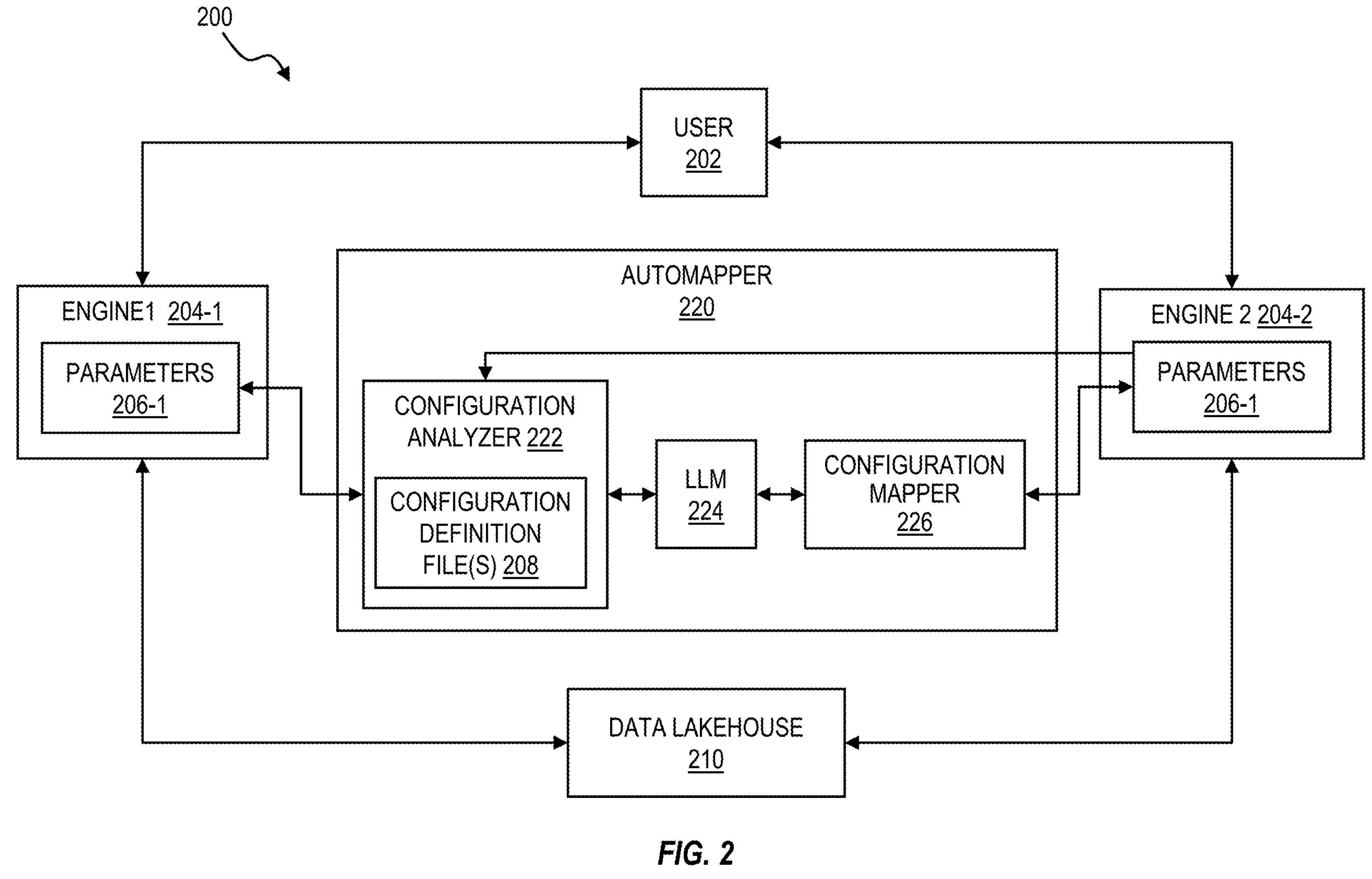
FIG. 2 depicts a block diagram of a system for automatic configuration of system parameters across multiple compute engines in data lakehouse environments in accordance with one or more embodiments of the present disclosure.

Referring now to FIG. 2, a block diagram of a system 200 for automatically configuring system parameters across multiple compute engines in a data lakehouse environment in accordance with one or more embodiments of the present disclosure is shown. In one embodiment, the system 200 is configured to enable the automatic configuration of system parameters across multiple compute engines 204 within a data lakehouse environment. The system 200 includes several interconnected components, each contributing to the seamless transition and optimization of parameters.

In exemplary embodiments, the automapper 220 orchestrates the interaction among various components to automatically configure system parameters across multiple compute engines. The user 202 initiates the configuration process and provides input or confirmation when necessary. For example, the user 202 may initiate the configuration process by identifying a desired transition from a first engine 204-1 to a second engine 204-2. The user 202 engages with the system to review suggested parameter mappings and make decisions on configurations that require manual intervention, ensuring alignment with specific performance goals and operational requirements.

In exemplary embodiments, engine1 204-1 and engine2 204-2 are the compute engines involved in the parameter configuration process. Engine1 204-1 is the source engine from which the existing configuration parameters 206-1 are obtained, having been optimized over time to meet specific workload requirements. Engine2 204-2 is the target engine to which the parameters are mapped and applied. The automapper 220 facilitates the transition from engine1 204-1 to engine2 204-2, ensuring that performance optimizations achieved in engine1 204-1 are effectively transferred to engine2 204-2.

In a data lakehouse environment, compute engines like Engine1 204-1 are initially configured with default parameters that serve as a baseline for performance. However, as users begin to execute various workloads, they often find that these default settings do not fully meet the specific performance requirements of their tasks. To address this, users iteratively adjust the configuration parameters 206-1 to optimize the engine's performance for their particular workloads. This optimization process involves monitoring the engine's performance metrics, such as execution time, resource utilization, and query throughput, and making incremental changes to the parameters to enhance these metrics.

For example, consider a scenario where a user is running complex analytical queries that require significant memory resources. Initially, the parameter for maximum memory allocation might be set to a default value of 1 GB. As the user observes that queries are taking longer to execute due to memory constraints, they may increase the maximum memory allocation to 2 GB to improve performance. Similarly, if the user notices that the engine is capable of handling more concurrent queries without degrading performance, they might increase the maximum concurrency parameter from 10 to 15. Over time, these adjustments lead to a configuration that is finely tuned to the specific workload requirements, ensuring optimal performance and resource utilization. This iterative process of monitoring, adjusting, and optimizing configuration parameters allows users to adapt the compute engine to evolving workload demands, ultimately achieving a balance between performance and resource efficiency.

In exemplary embodiments, the parameters 206-1 are the specific configuration settings associated with each compute engine 206, including system-level and database-level settings fine-tuned to optimize query execution and performance. These parameters dictate how each engine processes and manages data. The Automapper 220 utilizes these parameters to create a configuration definition file 208, which serves as a reference for mapping and applying settings to the new engine.

In exemplary embodiments, the parameters 206-1 encompass a range of configuration settings that are crucial for optimizing the performance of each compute engine 206. These settings include both system-level and database-level parameters, each playing a distinct role in dictating how the engine processes and manages data. System-level parameters might involve settings such as maximum memory allocation, which determines the amount of memory available for query execution, and maximum concurrency, which specifies the number of queries that can be processed simultaneously. Database-level parameters could include query timeout settings, which define the maximum duration a query can run before being terminated, and data scan limits, which restrict the volume of data that can be scanned during query execution.

For instance, a parameter like query.max-memory might be adjusted to ensure that complex queries requiring substantial memory resources are executed efficiently, while query.max-concurrency could be fine-tuned to allow more queries to be processed concurrently without compromising performance. Similarly, query.timeout settings might be modified to accommodate longer-running analytical queries, ensuring they are completed successfully without premature termination. By carefully adjusting these parameters, users can tailor the compute engine's performance to meet specific workload requirements, thereby optimizing query execution and enhancing overall system efficiency.

In exemplary embodiments, the configuration definition file(s) 208 contains detailed information about the parameters 206-1, including their names, values, and contextual metadata. Generated by the configuration analyzer 222, these files are used by the configuration mapper 226 to identify equivalent parameters in engine2 204-2, ensuring a smooth transition between engines and preserving performance optimizations achieved in engine1 204-1.

In exemplary embodiments, the data lakehouse 210 is that data source that the compute engines are configured to query. The data lakehouse 210 provides shared metadata and data sources that the engines access to perform queries and data processing tasks. The data lakehouse 210 enables the integration and management of diverse data sources, facilitating the operation of multiple compute engines. In exemplary embodiments, the data lakehouse 210 serves as a versatile environment that supports the integration and management of a wide array of data sources, enabling compute engines to perform queries and data processing tasks efficiently. These data sources can include structured data from traditional relational databases, which store information in tables with defined schemas, making it easy to perform complex queries and transactions. Additionally, semi-structured data sources, such as JSON or XML files, provide flexibility in data representation, allowing for the storage of nested and hierarchical data structures that can be queried using specialized engines. The data lakehouse also accommodates unstructured data sources, such as text documents, images, audio, and video files, which do not have a predefined data model. These types of data require advanced processing techniques, such as natural language processing or image recognition, to extract meaningful insights. Furthermore, the data lakehouse can integrate streaming data sources, which provide real-time data feeds from sensors, social media, or IoT devices, enabling timely analysis and decision-making.

In exemplary embodiments, the automapper 220 coordinates the configuration process, integrating the functionality of a configuration analyzer 222, an LLM 224, and a configuration mapper 226 to achieve automatic parameter mapping and application. The automapper 220 ensures an efficient transition between compute engines, retaining the performance benefits of the existing configuration in the new engine. In exemplary embodiments, the configuration analyzer 222 monitors changes in the configuration parameters 206-1 of engine1 204-1, capturing parameter names, values, and metadata, and generating the configuration definition file(s) 208. The configuration analyzer 222 ensures that all relevant information is available for the mapping process, enabling accurate and effective parameter transition. The LLM 224, or large language model, is a tool used by the automapper 220 to analyze and interpret the contextual meaning of configuration parameters. The LLM 224 leverages pre-trained models to understand relationships between parameters in different engines, facilitating the identification of equivalent settings. This capability aids the configuration mapper 226 in accurately mapping parameters from engine1 204-1 to engine2 204-2.

In exemplary embodiments, the configuration mapper 226 explores the configuration parameters of engine2 204-2 and maps them to the parameters captured in the configuration definition file(s) 208. The configuration mapper 226 utilizes insights provided by the LLM 224 to identify equivalent parameters and apply appropriate settings to the new engine, ensuring that performance optimizations achieved in Engine1 204-1 are effectively transferred to engine2 204-2, minimizing manual intervention and reducing configuration time.

In exemplary embodiments, the configuration mapper 226 is configured to identify corresponding parameters between the first engine 204-1 and the second engine 204-2. This identification is achieved through a detailed comparison of the configuration definition files generated for each engine. These files contain comprehensive information about the parameters, including their names, values, and contextual metadata, which are analyzed to establish equivalences between the engines. The process begins with the configuration mapper 226 utilizing insights from a pre-trained large language model (LLM) to interpret the contextual meanings of parameters in both engines. The LLM helps in understanding the semantic relationships between parameters, even if they differ in naming conventions or formats. The configuration mapper 226 then compares the contextual definitions of parameters from the configuration definition files of the first and second engines to identify potential correspondences.

For each identified pair of parameters, the configuration mapper 226 calculates a correspondence score. The correspondence score quantifies the degree of similarity between the parameters based on factors such as name similarity, contextual meaning, and historical usage patterns. In one embodiment, the score is calculated using a weighted algorithm that considers these factors, assigning higher weights to parameters with closely matching names and contextual meanings.

For example, consider a parameter in the first engine 204-1 named "query.max-memory" with a contextual definition indicating it sets the maximum memory allocation for query execution. In the second engine 204-2, a parameter named "memory.limit" might have a similar contextual definition. The configuration mapper 226 would analyze the names and definitions, and if the LLM indicates a high semantic similarity, it would assign a high correspondence score to this pair. In one embodiment, the correspondence score might be calculated as based on a name similarity score: 0.8 (based on string matching algorithms), a contextual meaning similarity score: 0.9 (based on LLM analysis), and a historical usage pattern score: 0.7 (based on past adjustments and optimizations), where the overall correspondence score could be a weighted sum of these individual scores, such as:

$$\text{Correspondence Score}=0.4\times\text{Name Similarity}+0.4\times\text{Contextual Meaning Similarity}+0.2\times\text{Historical Usage Pattern}$$

Substituting the values provides Correspondence Score$=0.4\times0.8+0.4\times0.9+0.2\times0.7=0.82$.

In exemplary embodiments, a high correspondence score, such as 0.82, indicates a strong likelihood that the parameters are equivalent, prompting the configuration mapper 226 to automatically apply the settings from the first engine to the second engine. If the score falls below a first threshold, such as 0.9, and above a second threshold, such as 0.7, the configuration mapper 226 may flag the pair for user review, ensuring accuracy in the configuration process.

Referring now to FIG. 3, a flowchart of a method for automatically configuring system parameters across multiple compute engines in a data lakehouse environment in accordance with one or more embodiments of the present disclosure is shown. In one embodiment, the method 300 is performed by an automapper 220 such as the one shown in FIG. 2.

At block 302, the method 300 involves obtaining a first set of configuration parameters from a first compute engine and a second set of configuration parameters from a second compute engine. This step can be performed by accessing the configuration settings stored within each engine's system files or databases. For example, in a Presto engine, parameters such as "query.max-memory" and "query.timeout" can be retrieved using system commands or API calls that list current settings and their values.

Next, as shown at block 304, the method 300 includes analyzing, using a pre-trained LLM, the first and second set of configuration parameters to establish a contextual definition for each of a plurality of parameters in the first set and the second set. This analysis involves processing the parameter names and descriptions through the LLM to understand their semantic meanings and relationships. For instance, the LLM might interpret "query.max-memory" in Presto as a parameter that sets the maximum memory allocation for query execution, and similarly analyze "memory.limit" in a Spark engine to determine its equivalent function.

The method 300 further includes creating a first configuration definition file that includes the first set of configuration parameters and the contextual definition for each of a plurality of parameters in the first set, as shown at block 306. This step involves compiling the analyzed data into a structured format, such as XML or JSON, that captures both the parameter values and their contextual meanings. For example, the configuration definition file for Presto might list "query.max-memory=2 GB" along with its contextual definition as the maximum memory allocation for queries.

Similarly, at block 308, a second configuration definition file is created, encompassing the second set of configuration parameters and their contextual definitions. This file is generated using the same process as the first, ensuring that the parameters from the second engine, such as Spark, are documented with their values and contextual meanings, like "memory.limit=2 GB" with its definition as the memory cap for query execution.

As shown at block 310, the method 300 involves determining a correspondence between one or more parameters of the first set of configuration parameters and one or more parameters of the second set of configuration parameters based on a comparison of the first configuration definition and the second configuration definition file. This step includes calculating a correspondence score for each identified pair, which quantifies the degree of similarity between the parameters. For example, the correspondence score between "query.max-memory" in Presto and "memory.limit" in Spark might be calculated based on name similarity, contextual meaning, and historical usage patterns.

Finally, at block 312, the method 300 includes automatically applying, by the second compute engine, parameter values from the first set of configuration parameters to the second set of configuration parameters based on the correspondence. In exemplary embodiments, this automatic application is performed when the correspondence score exceeds a predefined threshold, ensuring accurate and efficient parameter mapping. For instance, if the score between "query.max-memory" and "memory.limit" is above the threshold, the system automatically sets "memory.limit" in Spark to 2 GB, mirroring the configuration from Presto.

In one embodiment, the first set of configuration parameters from the first compute engine includes a parameter name, a parameter value, and metadata that describes the contextual meaning of each parameter. This metadata can be derived from user manuals, setup guides, or embedded comments within the code, providing a comprehensive understanding of each parameter's role and function. In another embodiment, the metadata is dynamically generated by a configuration analyzer component that monitors changes in the parameter values over time, capturing both the initial default settings and any user-defined modifications. This allows the system to maintain an up-to-date contextual understanding of the parameters as they evolve. Additionally, the metadata may include historical usage patterns and performance metrics associated with each parameter, enabling a more nuanced mapping to the second compute engine.

In one embodiment, the second set of configuration parameters for the second compute engine may include default parameters that are pre-configured by the engine's manufacturer, providing a baseline for system performance. These default parameters could encompass a wide range of settings, such as memory allocation, execution time limits, and concurrency levels, each accompanied by metadata that describes their contextual meaning within the engine's operational framework.

In one embodiment, the system for automatically applying parameter values from a first set of configuration parameters to a second set based on a correspondence score includes a user interface that allows users to set the threshold values for automatic application. This interface can be customized to accommodate different user preferences and organizational requirements, providing flexibility in how the system determines when to apply parameter values automatically. In another embodiment, the system employs machine learning algorithms to dynamically adjust the threshold values based on historical data and user feedback, optimizing the accuracy of parameter mappings over time. This adaptive approach ensures that the system remains responsive to evolving workload demands and user expectations. Additionally, the system may incorporate a notification mechanism that alerts users when a correspondence score falls within a predefined range, prompting them to review and confirm the mappings before automatic application. This embodiment enhances user control and oversight, ensuring that significant configuration changes are made with user approval.

In one embodiment, the system for confirming possible correspondences between parameters utilizes a graphical user interface (GUI) that presents the user with a side-by-side comparison of parameters from the first and second compute engines. This interface allows users to manually review and confirm or reject the suggested mappings. In another embodiment, the system employs a notification system that sends alerts to the user's device, prompting them to review the potential correspondences. In yet another embodiment, the system integrates with existing enterprise software platforms, such as a configuration management database (CMDB), where the suggested mappings are logged, and users can approve or modify them directly within the platform. Additionally, the system could incorporate machine learning algorithms that learn from user feedback over time, improving the accuracy of future parameter mappings and reducing the need for manual confirmation. These embodiments demonstrate the flexibility of the system in adapting to various user preferences and organizational workflows, ensuring efficient and accurate parameter configuration across different compute engines.

In one embodiment, the pre-trained large language model (LLM) is specifically trained using a dataset that includes metadata from a variety of compute engines, such as Presto, Spark, and Netezza, to enhance the model's contextual understanding of configuration parameters. This training allows the LLM to accurately interpret and map parameters across different engines, facilitating seamless transitions between them. In another embodiment, the LLM is trained on a broader dataset that encompasses metadata from both traditional database systems and modern data lakehouse environments, thereby expanding its applicability to a wider range of computing scenarios. This embodiment ensures that the LLM can handle diverse parameter sets and configurations, making it adaptable to various operational requirements. Additionally, the LLM can be configured to prioritize certain types of metadata, such as performance-related parameters or security settings, depending on the specific needs of the user or organization. This prioritization can be adjusted dynamically, allowing the system to focus on the most relevant aspects of the configuration during the mapping process. Furthermore, the LLM can be integrated with external data sources, such as user manuals or setup guides, to supplement its training data and improve its accuracy in parameter mapping. This integration can be achieved through APIs or other data exchange mechanisms, providing the LLM with real-time access to current information about compute engine configurations.

In one embodiment, the logging system is designed to record parameter mappings and changes to parameter values in real-time, utilizing a centralized database that stores logs for easy retrieval and analysis. This embodiment allows for efficient tracking of configuration changes across multiple compute engines, providing a comprehensive audit trail that can be accessed by system administrators to monitor and optimize system performance. In another embodiment, the logging system is integrated with a cloud-based platform, enabling remote access and management of logs from any location. This setup is particularly beneficial for organizations with distributed teams, as it facilitates collaboration and ensures that all stakeholders have access to the most recent configuration data. Additionally, the logging system can be configured to generate alerts or notifications when significant changes occur, such as when a parameter mapping fails or when a new parameter is introduced. This proactive approach helps in maintaining system stability and performance by allowing timely interventions. Furthermore, the logging system can be customized to include various levels of detail, from basic parameter changes to detailed metadata descriptions, depending on the specific needs of the organization. This flexibility ensures that the logging system can be tailored to suit different operational requirements, making it a versatile tool for managing configuration changes in a data lakehouse environment.

In exemplary embodiments, the method for automatically configuring system parameters across multiple compute engines in a data lakehouse environment enhances the functioning of a computer system by streamlining the process of transitioning between different compute engines, thereby optimizing data retrieval and processing tasks. This method leverages a pre-trained large language model (LLM) to analyze and establish contextual definitions for configuration parameters, enabling the system to automatically map and apply parameter values from one engine to another. By automating the configuration process, the method reduces the manual effort and time typically required to understand and adjust parameters when switching engines. This automation minimizes the risk of human error, ensuring that the system maintains consistent performance levels across different compute engines. As a result, the computer system can efficiently adapt to changes in workload demands or organizational requirements, allowing for seamless transitions without compromising data processing efficiency. Moreover, the method's ability to preserve performance optimizations achieved in the original engine ensures that the computer system continues to operate at optimal levels, even after transitioning to a new engine. This capability enhances the system's responsiveness and agility, enabling it to quickly adjust to new configurations and maintain high levels of data processing performance. Consequently, the computer system can more effectively obtain and process data from the data lakehouse, supporting timely and informed decision-making based on accurate and comprehensive data analysis.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for automatically configuring system parameters across multiple compute engines in a data lakehouse environment, the method comprising:

obtaining a first set of configuration parameters from a first compute engine;

obtaining a second set of configuration parameters from a second compute engine;

analyzing, using a pre-trained large language model (LLM), the first set of configuration parameters to establish a contextual definition for each of a plurality of parameters in the first set;

creating a first configuration definition file that includes the first set of configuration parameters and the contextual definition for each of a plurality of parameters in the first set;

analyzing, using the pre-trained LLM, the first set of configuration parameters to establish a contextual definition for each of a plurality of parameters in the second set;

creating a second configuration definition file that includes the second set of configuration parameters and the contextual definition for each of a plurality of parameters in the second set;

determining a correspondence between one or more parameters of the first set of configuration parameters and one or more parameters of the second set of configuration parameters based on a comparison of the first configuration definition and the second configuration definition file; and automatically applying, by the second compute engine, parameter values from the first set of configuration parameters to the second set of configuration parameters based on the correspondence, wherein the pre-trained LLM is trained on a dataset that includes metadata from various compute engines to enhance contextual understanding.

2. The computer-implemented method of claim 1, wherein the first set of configuration parameters includes a parameter name, a parameter value, and metadata describing a contextual meaning of the parameter for each of the plurality of parameters in the first set.

3. The computer-implemented method of claim 1, wherein the second set of configuration parameters are default parameters for the second compute engine and include a parameter name, a default parameter value, and metadata describing a contextual meaning of the parameter for each of the plurality of parameters in the second set.

4. The computer-implemented method of claim 1, wherein determining a correspondence between one or more parameters of the first set of configuration parameters and one or more parameters of the second set of configuration parameters includes calculating a correspondence score for each identified corresponding pair of between the first set of configuration parameters and the second set of configuration parameters.

5. The computer-implemented method of claim 4, wherein the automatically applying is performed based on a determination that the correspondence score exceeds a first threshold value.

6. The computer-implemented method of claim 5, further comprising transmitting a request to a user to confirm a possible correspondence between a parameter of the first set of configuration parameters and a parameter of the second set of configuration parameters based on a determination that the correspondence score is less than the first threshold value and greater than a second threshold value.

7. The computer-implemented method of claim 4, wherein the correspondence score is calculated using a weighted algorithm that considers name similarity, contextual meaning similarity, and historical usage patterns, with adjustable weights.

8. The computer-implemented method of claim 1, further comprising creating a long that records all parameter mappings and changes to parameter values.

9. A computer program product having one or more computer readable storage media having computer readable program code collectively stored on the one or more computer readable storage media, the computer readable program code being executed by a processor of a computer system to cause the computer system to perform operations comprising:

obtaining a first set of configuration parameters from a first compute engine;

obtaining a second set of configuration parameters from a second compute engine;

analyzing, using a pre-trained large language model (LLM), the first set of configuration parameters to establish a contextual definition for each of a plurality of parameters in the first set;

creating a first configuration definition file that includes the first set of configuration parameters and the contextual definition for each of a plurality of parameters in the first set;

analyzing, using the pre-trained LLM, the first set of configuration parameters to establish a contextual definition for each of a plurality of parameters in the second set;

creating a second configuration definition file that includes the second set of configuration parameters and the contextual definition for each of a plurality of parameters in the second set;

determining a correspondence between one or more parameters of the first set of configuration parameters and one or more parameters of the second set of configuration parameters based on a comparison of the first configuration definition and the second configuration definition file; and automatically applying, by the second compute engine, parameter values from the first set of configuration parameters to the second set of configuration parameters based on the correspondence, wherein the pre-trained LLM is trained on a dataset that includes metadata from various compute engines to enhance contextual understanding.

10. The computer program product of claim 9, wherein the first set of configuration parameters includes a parameter name, a parameter value, and metadata describing a contextual meaning of the parameter for each of the plurality of parameters in the first set.

11. The computer program product of claim 9, wherein the second set of configuration parameters are default parameters for the second compute engine and include a parameter name, a default parameter value, and metadata describing a contextual meaning of the parameter for each of the plurality of parameters in the second set.

12. The computer program product of claim 9, wherein determining a correspondence between one or more parameters of the first set of configuration parameters and one or more parameters of the second set of configuration parameters includes calculating a correspondence score for each identified corresponding pair of between the first set of configuration parameters and the second set of configuration parameters.

13. The computer program product of claim 12, wherein the automatically applying is performed based on a determination that the correspondence score exceeds a first threshold value.

14. The computer program product of claim 13, wherein the operations further comprise transmitting a request to a user to confirm a possible correspondence between a parameter of the first set of configuration parameters and a parameter of the second set of configuration parameters based on a determination that the correspondence score is less than the first threshold value and greater than a second threshold value.

15. The computer program product of claim 12, wherein the correspondence score is calculated using a weighted algorithm that considers name similarity, contextual meaning similarity, and historical usage patterns, with adjustable weights.

16. The computer program product of claim 9, wherein the operations further comprise creating a long that records all parameter mappings and changes to parameter values.

17. A computing system comprising:

a processor;

a memory coupled to the processor; and one or more computer readable storage media coupled to the processor, the one or more computer readable storage media collectively containing instructions that are executed by the processor via the memory to cause the processor to perform operations comprising:

obtaining a first set of configuration parameters from a first compute engine;

obtaining a second set of configuration parameters from a second compute engine;

analyzing, using a pre-trained large language model (LLM), the first set of configuration parameters to establish a contextual definition for each of a plurality of parameters in the first set;

creating a first configuration definition file that includes the first set of configuration parameters and the contextual definition for each of a plurality of parameters in the first set;

analyzing, using the pre-trained LLM, the first set of configuration parameters to establish a contextual definition for each of a plurality of parameters in the second set;

creating a second configuration definition file that includes the second set of configuration parameters and the contextual definition for each of a plurality of parameters in the second set;

determining a correspondence between one or more parameters of the first set of configuration parameters and one or more parameters of the second set of configuration parameters based on a comparison of the first configuration definition and the second configuration definition file; and automatically applying, by the second compute engine, parameter values from the first set of configuration parameters to the second set of configuration parameters based on the correspondence, wherein the pre-trained LLM is trained on a dataset that includes metadata from various compute engines to enhance contextual understanding.

18. The system of claim 17, wherein determining a correspondence between one or more parameters of the first set of configuration parameters and one or more parameters of the second set of configuration parameters includes calculating a correspondence score for each identified corresponding pair of between the first set of configuration parameters and the second set of configuration parameters.

* * * * *